(12) United States Patent
Byl et al.

(10) Patent No.: US 9,938,156 B2
(45) Date of Patent: Apr. 10, 2018

(54) B2F4 MANUFACTURING PROCESS

(71) Applicant: Entegris, Inc., Billerica, MA (US)

(72) Inventors: Oleg Byl, Southbury, CT (US); Edward E. Jones, Woodbury, CT (US); Chiranjeevi Pydi, Danbury, CT (US); Joseph D. Sweeney, New Milford, CT (US)

( * ) Notice: Subject to any disclaimer, the term of this patent is extended or adjusted under 35 U.S.C. 154(b) by 869 days.

(21) Appl. No.: 14/350,543

(22) PCT Filed: Oct. 9, 2012

(86) PCT No.: PCT/US2012/059357
§ 371 (c)(1),
(2) Date: Apr. 8, 2014

(87) PCT Pub. No.: WO2013/055688
PCT Pub. Date: Apr. 18, 2013

(65) Prior Publication Data
US 2014/0301932 A1    Oct. 9, 2014

Related U.S. Application Data

(60) Provisional application No. 61/545,546, filed on Oct. 10, 2011.

(51) Int. Cl.
*B01J 7/00* (2006.01)
*C01B 35/06* (2006.01)
(Continued)

(52) U.S. Cl.
CPC ............... *C01B 35/061* (2013.01); *B01J 3/03* (2013.01); *B01J 7/00* (2013.01); *B01J 15/00* (2013.01);
(Continued)

(58) Field of Classification Search
CPC ..................................................... C01B 35/061
(Continued)

(56) References Cited

U.S. PATENT DOCUMENTS 2,994,652 A * 8/1961 Frazer .................... B01J 19/087
204/157.43
3,180,708 A * 4/1965 McCloskey ............. C01B 35/06
423/293
(Continued)

FOREIGN PATENT DOCUMENTS

CN         101214970 A        7/2008
CN         105905916 A        8/2016
(Continued)

OTHER PUBLICATIONS

Brotherton et al. New Synthesis of Diboron Tetrafluoride. Inorganic Chemistry, vol. 2, No. 1, Feb. 1963, pp. 41-43.*
(Continued)

*Primary Examiner* — Jennifer A Leung

(57) ABSTRACT

A reaction system and method for preparing compounds or intermediates from solid reactant materials is provided. In a specific aspect, a reaction system and methods are provided for preparation of boron-containing precursor compounds useful as precursors for ion implantation of boron in substrates. In another specific aspect, a reactor system and methods are provided for manufacture of boron precursors such as $B_2F_4$.

8 Claims, 8 Drawing Sheets

(51) Int. Cl.
*B01J 8/02* (2006.01)
*B01J 15/00* (2006.01)
*B01J 19/00* (2006.01)
*B01J 19/12* (2006.01)
*B01J 3/03* (2006.01)

(52) U.S. Cl.
CPC ......... *B01J 19/0073* (2013.01); *B01J 19/129* (2013.01); *B01J 2219/00094* (2013.01); *B01J 2219/00148* (2013.01); *B01J 2219/0254* (2013.01); *B01J 2219/0272* (2013.01); *B01J 2219/0277* (2013.01); *B01J 2219/0886* (2013.01); *Y02P 20/149* (2015.11)

(58) Field of Classification Search
USPC ........................................................ 423/293
See application file for complete search history.

(56) References Cited

U.S. PATENT DOCUMENTS

| | | |
|---|---|---|
| 4,657,774 A | 4/1987 | Satou et al. |
| 4,680,358 A | 7/1987 | Yu |
| 4,722,978 A | 2/1988 | Yu |
| 4,803,292 A | 2/1989 | Ohfune et al. |
| 4,851,255 A | 7/1989 | Lagendijk et al. |
| 4,942,246 A | 7/1990 | Tanaka et al. |
| 5,061,322 A | 10/1991 | Asano |
| 5,478,453 A * | 12/1995 | Bernard .................. C01B 33/04 204/164 |
| 5,935,283 A | 8/1999 | Sweeney et al. |
| 5,935,293 A | 8/1999 | Detering et al. |
| 5,977,552 A | 11/1999 | Foad |
| 5,993,766 A | 11/1999 | Tom et al. |
| 6,086,837 A | 7/2000 | Cowan et al. |
| 6,096,467 A | 8/2000 | Shimizu et al. |
| 6,135,128 A | 10/2000 | Graf et al. |
| 6,310,240 B1 | 10/2001 | Contractor et al. |
| 6,376,664 B1 | 4/2002 | Chan et al. |
| 6,420,304 B1 | 7/2002 | Tsai et al. |
| 6,452,338 B1 | 9/2002 | Horsky |
| 6,486,227 B2 | 11/2002 | Nohr et al. |
| 6,600,092 B2 | 7/2003 | Lee |
| 6,730,568 B2 | 5/2004 | Sohn |
| 6,780,896 B2 | 8/2004 | MacDonald et al. |
| 6,852,610 B2 | 2/2005 | Noda |
| 6,872,639 B2 | 3/2005 | DeBoer et al. |
| 6,893,907 B2 | 5/2005 | Maydan et al. |
| 6,905,947 B2 | 6/2005 | Goldberg |
| 7,094,670 B2 | 8/2006 | Collins et al. |
| 7,138,768 B2 | 11/2006 | Maciejowski et al. |
| 7,144,809 B2 | 12/2006 | Elers et al. |
| 7,397,048 B2 | 7/2008 | Singh et al. |
| 7,473,606 B2 | 1/2009 | Hsiao et al. |
| 7,641,879 B2 | 1/2010 | Spielvogel et al. |
| 7,666,770 B2 | 2/2010 | Sasaki et al. |
| 7,759,657 B2 | 7/2010 | Tieger et al. |
| 7,825,016 B2 | 11/2010 | Giles |
| 7,833,886 B2 | 11/2010 | Giles et al. |
| 2002/0085446 A1 | 7/2002 | Van Den Brink et al. |
| 2002/0130278 A1 | 9/2002 | Vella |
| 2003/0056720 A1 | 3/2003 | Dauelsberg et al. |
| 2003/0203608 A1 | 10/2003 | Deboer et al. |
| 2003/0216014 A1 | 11/2003 | Goldberg |
| 2004/0002202 A1 | 1/2004 | Horsky et al. |
| 2004/0110351 A1 | 6/2004 | Narasimha |
| 2004/0166612 A1 | 8/2004 | Maydan et al. |
| 2005/0035284 A1 | 2/2005 | Schultz et al. |
| 2005/0051096 A1 | 3/2005 | Horsky et al. |
| 2005/0163693 A1 | 7/2005 | Spielvogel et al. |
| 2005/0176832 A1 | 8/2005 | Tonkovich et al. |
| 2005/0202657 A1 | 9/2005 | Borland et al. |
| 2006/0102464 A1 | 5/2006 | Tillotson |
| 2006/0104851 A1 | 5/2006 | Tillotson |
| 2006/0264051 A1 | 11/2006 | Thibaut |
| 2007/0059848 A1 | 3/2007 | Sasaki et al. |
| 2007/0178679 A1 | 8/2007 | Hatem et al. |
| 2008/0149929 A1 | 6/2008 | Giles |
| 2008/0248636 A1 | 10/2008 | Olander et al. |
| 2009/0294698 A1 | 12/2009 | Ray |
| 2010/0112795 A1 | 5/2010 | Kaim et al. |
| 2010/0255198 A1 | 10/2010 | Cleary et al. |
| 2010/0266087 A1 | 10/2010 | Ahlfield et al. |
| 2011/0065268 A1 | 3/2011 | Olander et al. |
| 2011/0159671 A1 | 6/2011 | Kaim et al. |
| 2011/0212330 A1 | 9/2011 | Schrumpf et al. |
| 2012/0051994 A1 | 3/2012 | Byl et al. |

FOREIGN PATENT DOCUMENTS

| | | |
|---|---|---|
| EP | 0079705 A1 | 5/1983 |
| EP | 0385709 B1 | 5/1995 |
| EP | 0656668 B1 | 3/1999 |
| GB | 949265 A | 2/1964 |
| JP | 58-8071 A | 1/1983 |
| JP | 61186212 A * | 8/1986 |
| JP | 63-15228 A | 1/1988 |
| JP | 64-83147 A | 3/1989 |
| JP | 1-225117 A | 9/1989 |
| JP | H05-115786 A | 5/1993 |
| JP | 5-254808 A | 10/1993 |
| JP | 6-80681 A | 3/1994 |
| JP | 7-90201 A | 4/1995 |
| JP | 10-251592 A | 9/1998 |
| JP | 2000-135402 A | 5/2000 |
| JP | 2002-343882 A | 11/2002 |
| TW | 482759 B | 4/2002 |
| WO | 9811764 A1 | 3/1998 |
| WO | 03057667 A2 | 7/2003 |
| WO | 03100806 A1 | 12/2003 |
| WO | 2004053945 A2 | 6/2004 |
| WO | 2005027208 A1 | 3/2005 |
| WO | 2006095086 A2 | 9/2006 |
| WO | 2007027798 A2 | 3/2007 |
| WO | 2011056515 A2 | 5/2011 |
| WO | 2012/030679 A2 | 3/2012 |

OTHER PUBLICATIONS

Brennan. A Novel Vapor Pump Applied to the Synthesis of Diboron Tetrachloride. Inorganic Chemistry, vol. 13, No. 2, 1974, pp. 490-491.*

Massey et al. The preparation of Diboron Tetrachloride and Other Boron Sub-Chlorides. Journal of Inorganic Nuclear Chemistry, 1966, vol. 28, pp. 365 to 370.*

Begak, O., "Boron isotopic exchange in heterogenous system boron—boron fluoride", "Radiokhimiya", 1988, pp. 234-237 (English Abstract), vol. 30, No. 2.

Note: For the non-patent literature citations that no month of publication is indicated, the year of publication is more than 1 year prior to the effective filing date of the present application.

Becher, H., et al., "Vibrational Spectra of Normal, Boron-10-Enriched, and Deuteriomethylboron Difuoride", "Spectrochimica Acta Part A: Molecular Spectroscopy", 1978, pp. 141-146 (English Abstract), vol. 34, No. 2.

Kirk, R., "Dissertation on Synthetic Chemistry of Several High Temperature Boron Containing Species", 1969, pp. 1-118.

Kirk, R., et al., "Boron-Fluorine Chemistry. III. Silicon—Boron Fluorides", "Journal of the American Chemical Society", Nov. 5, 1969, pp. 6315-6318, vol. 91, No. 23.

Timms, P., "Boron-Fluorine Chemisty. I. Boron Monofluoride and Some Derivatives", "Journal of the American Chemical Society", Mar. 29, 1967, pp. 1629-1637, vol. 89, No. 7.

Weast, R. (ED.), "Physical Constants of Inorganic Compounds—Boric Acid", "Handbook of Chemistry and Physics, 56th Edition", Sep. 1975, pp. B-78, Publisher: CRC Press, Inc.

Weast, R. (ED.), "Vapor Pressure Inorganic Compounds ", "Handbook of Chemistry and Physics, 56 Ed.", Sep. 1975, pp. D-183-D-188, Publisher: CRC Press, Inc.

(56) References Cited

OTHER PUBLICATIONS

Yu, J., et al., "Isotopically Enriched 10BN Nanotubes", "Advanced Materials", Jul. 2006, pp. 2157-2160, vol. 18.

\* cited by examiner

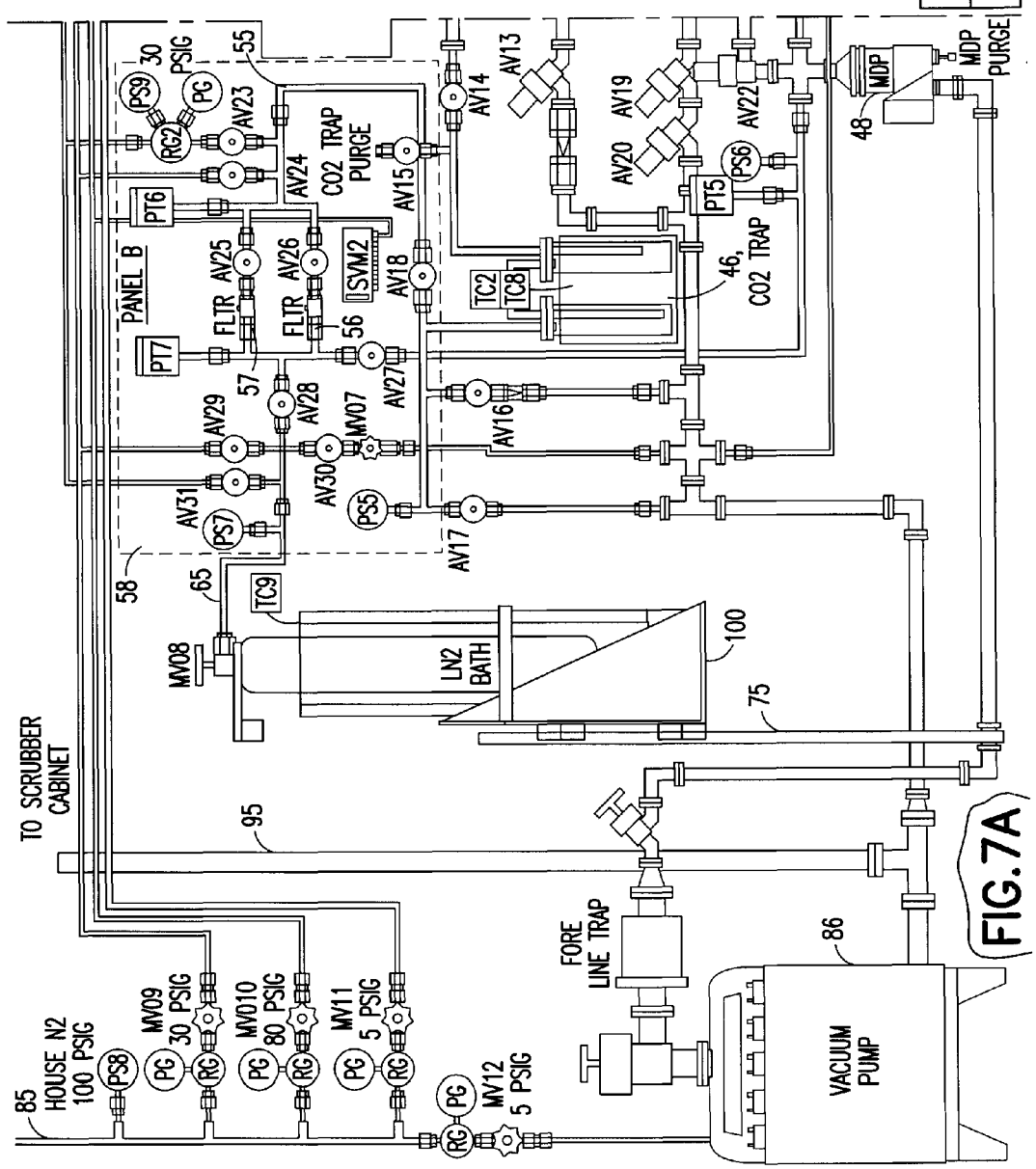

B2F4 MANUFACTURING PROCESS

CROSS REFERENCE TO RELATED APPLICATIONS

This application is a U.S. national phase under the provisions of 35 U.S.C. § 371 of International Patent Application No. PCT/US12/59357 filed Oct. 9, 2012, which in turn claims the benefit of priority of U.S. Provisional Patent Application No. 61/545,546 filed on Oct. 10, 2011. The disclosures of such international patent application and U.S. provisional patent application are hereby incorporated herein by reference, in their respective entireties, for all purposes.

FIELD

The present disclosure relates to a reaction system and method for preparing compounds or intermediates from solid reactant materials. In a specific aspect, the disclosure relates to a reaction system and methods of such type for preparation of boron-containing precursor compounds useful as precursors for ion implantation of boron in substrates.

DESCRIPTION OF THE RELATED ART

Ion implantation is utilized extensively in the manufacture of microelectronic device products and in other industrial applications. In the ion implantation process, a chemical species is deposited in a substrate by impingement of energetic ions on the substrate. To produce the desired ions, a precursor is required that is susceptible to ionization resulting in an ionized medium that may variously include precursor fragments, positive ions, negative ions, and recombinant ionic and non-ionic species. This ionized medium is processed by extraction, magnetic filtering, acceleration/deceleration, analyzer magnet processing, collimation, scanning and magnetic correction to produce the final ion beam of the desired type of ions that is impinged on the substrate.

Precursors of widely varying type are utilized to form correspondingly varied implanted materials and devices. Illustrative precursors include argon, oxygen, hydrogen, and hydrides and halides of dopant elements such as arsenic, phosphorus, germanium, boron, silicon, etc. Boron in particular is a very widely used dopant element, and in recent years attention has been focused on increasing the efficiency and utilization of existing boron precursors and developing new ones.

One of the main steps in manufacturing of many integrated circuits involves implantation of boron into silicon wafers. Since elemental boron exhibits very low vapor pressure even at high temperatures, utilization of volatile boron-containing precursor compounds is necessary. Currently, boron trifluoride ($BF_3$) is widely used as a precursor for boron implantation. In 2007, worldwide consumption of $BF_3$ for ion implantation was estimated to be on the order of ~3000 kg, and this volume has continued to grow.

Despite its widespread utilization, $BF_3$ does have disadvantages. The $BF_3$ molecule is very difficult to ionize and only about 15% of all $BF_3$ flowed into the ion source chamber of conventional ionizers can be fragmented. The rest is discarded. Further, only about 30% of the ionized $BF_3$ is converted into $B^+$ ions that can be used for implantation. This results in low $B^+$ beam current that severely limits implantation process throughput.

Some increase of $B^+$ beam current can be achieved by varying the process parameters, such as by raising the extraction current, and by increasing the $BF_3$ flow rate. These measures, however, result in reduced life time of the ion source, high voltage arcing that in turn leads to tool instability, poor vacuum and beam energy contamination.

Throughput limitations associated with low $B^+$ beam current in the use of $BF_3$ have become more important in the semiconductor manufacturing industry in recent years due to the general trend in such industry to utilization of lower implantation energies. At lower implantation energies, the $B^+$ beam experiences a greater blow-out effect due to space charge.

A high-volume manufacturing capability for alternative boron precursors that are reliable and cost-effective in character would therefore provide a major contribution to the art of semiconductor manufacturing as well as other ion implantation applications in which boron doping is employed.

SUMMARY

The present disclosure relates to a reactor system and methods for manufacture of boron precursors such as $B_2F_4$.

In one aspect, the disclosure relates to a reactor system comprising a reaction zone for contacting a gaseous reagent with a solid material under temperature and pressure conditions effective to form an intermediate species; an opening for allowing an unreacted portion of the gaseous reagent and the intermediate species to exit the reaction zone into a condensation zone; and a seal surrounding the opening, the seal sealingly connecting the reaction zone to the condensation zone.

In another aspect, the disclosure relates to a reactor system comprising a reaction zone for contacting $BF_3$ gas with boron-containing solids under temperature and pressure conditions effective to form an intermediate species; an opening for allowing an unreacted portion of $BF_3$ gas and the intermediate species to exit the reaction zone into a condensation zone for effecting reaction between the intermediate species and the unreacted portion of the $BF_3$ gas to form a reaction product comprising $B_2F_4$; a recovery zone for recovering the reaction product and unreacted $BF_3$ gas; and a recycling zone for recycling the recovered unreacted $BF_3$ gas to the reaction zone.

In a further aspect, the disclosure relates to a method of forming $B_2F_4$ comprising reacting $BF_3$ gas and boron-containing solids to form a first gaseous mixture comprising BF and unreacted $BF_3$ gas; cooling the first gaseous mixture under temperature and pressure conditions effective to condense the first gaseous mixture to form a condensed product; volatilizing the condensed product to form a second gaseous mixture comprising $B_2F_4$ and $BF_3$; filtering the second gaseous mixture to remove particulates; and recovering $B_2F_4$ from the second gaseous mixture.

In a further aspect, the disclosure relates to a method of forming $B_2F_4$ comprising reacting $BF_3$ gas and boron-containing solids to form a first gaseous mixture comprising BF and unreacted $BF_3$ gas; cooling the first gaseous mixture under temperature and pressure conditions effective to condense the first gaseous mixture to form a first condensed product;
volatilizing the first condensed product to form a second gaseous mixture comprising $B_2F_4$ and $BF_3$; cooling the second gaseous mixture under temperature and pressure conditions effective to condense the second gaseous mixture to form a second condensed product and a third gaseous mixture comprising $B_2F_4$ and $BF_3$; filtering the third gaseous mixture to remove particulates; and recovering $B_2F_4$ from the third gaseous mixture.

In a further aspect, the disclosure relates to an apparatus for production of $B_2F_4$, comprising a reactor containing a boron reactant that is reactive with boron trifluoride, $BF_3$, to yield boron fluoride, BF, wherein said reactor is configured to provide process conditions effective for reaction of $BF_3$ and said boron reactant to yield BF as a reaction product, and to discharge BF and unreacted $BF_3$ as a reactor effluent; a source of $BF_3$ arranged to supply $BF_3$ to the reactor; a condensation zone configured to receive the reactor effluent from the reactor and to provide process conditions effective for condensation of BF and $BF_3$ to yield $B_2F_4$; and a recirculation loop for flowing to the reactor unreacted $BF_3$ recoverable from the condensation, wherein the recirculation loop comprises a purification unit configured to purify recirculated $BF_3$ flowed to the reactor.

Other aspects, features and embodiments of the disclosure will be more fully apparent from the ensuing disclosure and appended claims.

DETAILED DESCRIPTION

Figure 1:
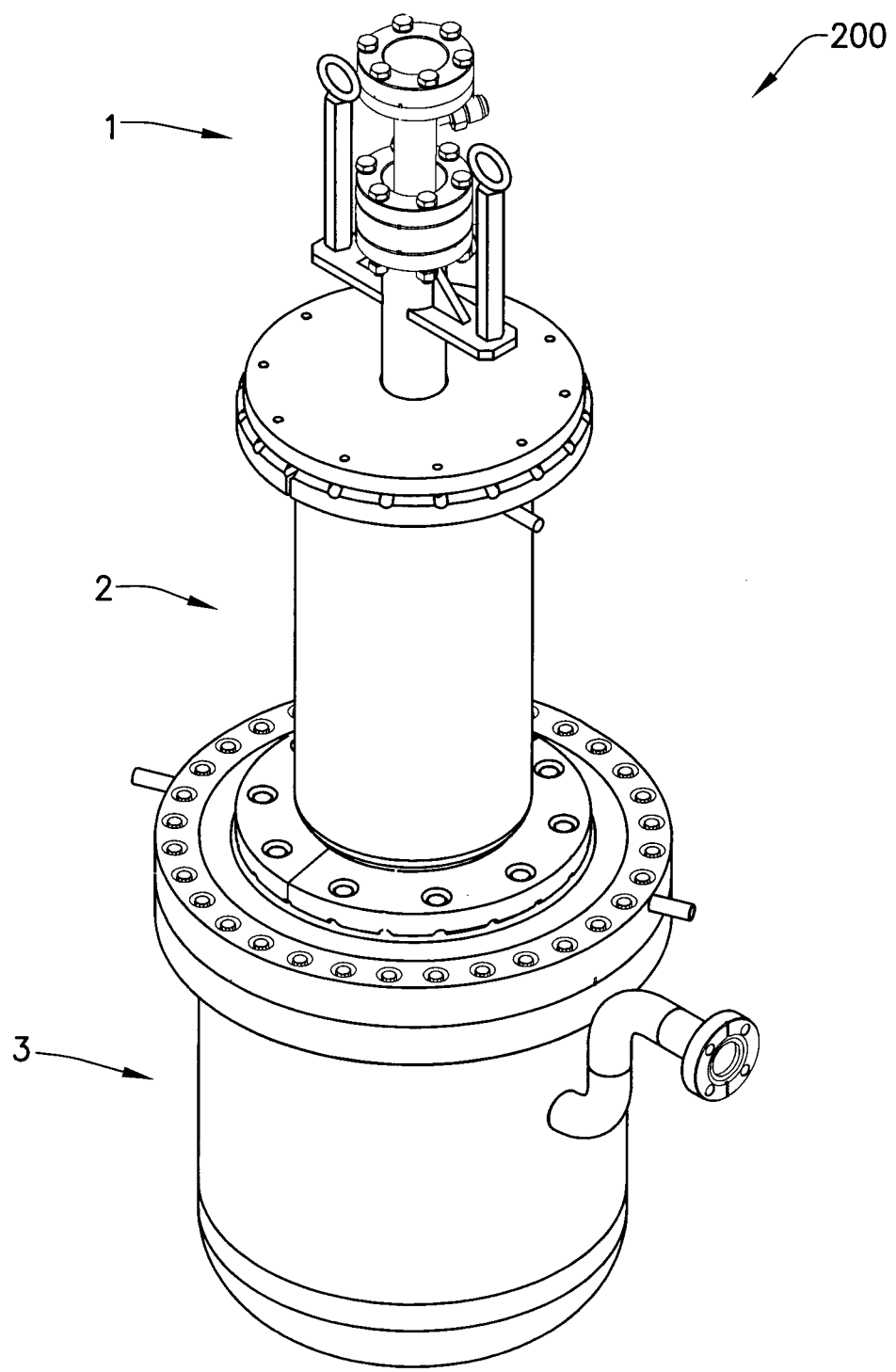
FIG. 1 is a perspective view of a reactor system according to one embodiment of the disclosure.

The present disclosure relates to a reactor system and methods for producing intermediate and final products from reaction of fluids with solid reactant materials. In a specific aspect, the present disclosure relates to a reactor system and methods for the manufacture of boron precursors such as $B_2F_4$.

In a more specific aspect, the present disclosure provides a reaction system and manufacturing process for $B_2F_4$. Diboron tetrafluoride is a liquefiable gas, having a melting point of −56° C. and a normal boiling point of −34° C., and a vapor pressure at 21° C. of 9.54 bar.

In a specific aspect of the present disclosure, diboron tetrafluoride ($B_2F_4$) is a precursor compound that provides advantages over the traditional boron trifluoride precursor, in part because of the nature of the boron-boron chemical bond, which makes $B_2F_4$ significantly easier to dissociate and ionize than boron trifluoride. In consequence, the use of diboron tetrafluoride enables significantly higher beam currents to be achieved. Atomic mass unit (AMU) magnet selection can be utilized to select the same ions for implantation ($^{11}B$ or $^{11}BF_2$) as are selected when boron trifluoride is used as the precursor in a same ion implant tool. In addition, diboron tetrafluoride can be supplied in enhanced safety vessels, e.g., pressure-regulated supply vessels such as those commercially available under the trademark VAC from ATMI, Inc. (Danbury, Conn., USA), or in a sorbent-containing supply vessels in which the sorbent serves as a storage medium for diboron tetrafluoride.

To produce diboron tetrafluoride in accordance with the present disclosure, boron or a boron-containing compound is contacted with $BF_3$ at elevated temperature to generate BF as an intermediate. In specific embodiments of this arrangement, the boron trifluoride is passed through a bed of boron-containing solids with the reaction zone at elevated temperature up to 2200° C., e.g., a temperature in a range of from 1000° C. to 2200° C. Sub-ranges of temperature within such broad range of 1000° C. to 2200° C. that may be usefully employed in specific applications include sub-ranges in which the lower temperature limit of the sub-range may have any suitable value, e.g., 1000° C., 1050° C., 1100° C., 1150° C., 1200° C., 1250° C., 1300° C., 1350° C., 1400° C., 1450° C., 1500° C., 1550° C., 1600° C., 1650° C., 1700° C., 1750° C., 1800° C., 1850° C., 1900° C., 1950° C., 2000° C., 2050° C., 2100° C. or 2150° C., and wherein the upper limit of such sub-range has a value that is greater than the lower limit of the sub-range, e.g., an upper temperature limit of 1050° C., 1100° C., 1150° C., 1200° C., 1250° C., 1300° C., 1350° C., 1400° C., 1450° C., 1500° C., 1550° C., 1600° C., 1650° C., 1700° C., 1750° C., 1800° C., 1850° C., 1900° C., 1950° C., 2000° C., 2050° C., 2100° C., 2150° C. or 2200° C. in specific embodiments. Still other temperature ranges can be employed in the broad practice of the disclosure to produce BF, or other temperature ranges of suitable character can be utilized when the reactor system and methods herein disclosed are employed in the production of other intermediates and final products.

The present disclosure contemplates thermal control of the reaction of the boron-containing compound and $BF_3$ gas in an integrated assembly in a reaction zone. Such control of temperature regulates the change of temperature in the reaction zone and is measured or otherwise detected such that the passage of heat energy into or out of the reaction zone is adjusted to achieve a desired average temperature. In particular, the temperature conditions in the reaction zone are thermally controlled to a predetermined temperature range.

Such thermal control may be accomplished through the use of thermocouples, thermostatic sensors, pyrometric sensors, or other devices that are adapted to sense or monitor temperature, in combination with heating and cooling equipment, processors, and CPUs and/or other controllers operatively linked with the heating and cooling equipment. Such system may be operated so that a temperature sensor generates a temperature sensing signal, which is conveyed to the processor, which in turn actuates a heater or a cooling device as necessary to maintain a desired set point temperature.

Boron monofluoride is a $B_2F_4$ precursor that is generated in a reaction zone or high temperature part of a reactor. A simple temporal temperature profile may be used which is intended (i) to elevate the temperature of the reaction zone to a certain level for the $BF_3+2B=3BF$ reaction to start and proceed in a controlled way, and (ii) to prevent thermal shock to reactor components due to high rate of temperature change.

In other embodiments, other temporal temperature profiles may offer certain advantages. For instance, an initial temperature ramp may be linear, step-wise, exponential or any other profile intended to increase the temperature of the reaction zone in a sufficiently rapid fashion. The temperature profile may be maintained as a linear profile or it may be of other shape, for example, to increase utilization of boron solids as they become depleted in the course of reaction. The temperature profile may also be synchronized with the $BF_3$ flow profile. The temperature ramp-down may be linear, step-wise, exponential or of any other shape that is optimized for fast cooling of the high temperature area without causing thermal shock to reactor components.

It also may be possible to optimize the spatial temperature profile to maximize BF production. For example, by using more than one radio frequency (RF) heating coil, such profile may be tuned to constitute the reaction zone in a certain volume of the reaction cavity. By using constructive interference of a few RF coils, the reaction zone can be migrated, changed in size or shape or modulated to improve production of BF. This also may be enhanced by mechanical movement of the reaction zone.

Pressure in the reaction of boron-containing solids and boron trifluoride, in specific embodiments, can be at any suitable value, e.g., pressure in a range of from 10^-6 to 1,000 torr.

The boron-containing solids utilized for the formation of intermediate BF can be of any suitable size and shape characteristics, e.g., size and shape characteristics that permit the solids to be loaded into the reaction zone to which $BF_3$ is delivered, so that the reactive solids in the reaction zone are contacted sufficiently with boron trifluoride to produce boron fluoride (BF) intermediate in a desired quantity.

Consistent with the preceding discussion, the reactive solid used in the broad practice of the present disclosure may be provided in any size particles or discontinuous forms, including powder, granules, pellets, platelets, solid films on substrate carrier particles, etc. In particular, optimized particle size distribution including uniform, normal, bi-, tri- and multimodal distributions may be used for better compacting of the boron-containing solids in the reaction zone. Such compacting results in prolonged reaction and, thus, higher $B_2F_4$ throughput. In addition, multimodal particle size distributions can be employed, to reduce void volume in the bed of solid reactive particles, and to maximize the amount of reactive solid per unit volume of the casing in which the bed of solid reactive particles is reposed. Solid particle size and shape may be optimized for better thermal uniformity of the particle bed and/or better gas flow behavior through the bed.

In one aspect of the disclosure, the boron-containing solids are engineered to expose lattice planes which are more reactive toward $BF_3$ to increase yield and throughput. For instance, if a (lmn) lattice plane is found to have higher reaction rate in BF generation, use of monocrystals of boron-containing material with high fraction of surface area of the (lmn) plane can be beneficial. Alternatively, crystallites with low fraction of the beneficial (lmn) lattice plane can be arranged into a macro structure to hide less reactive lattice planes and preferentially expose the more reactive one(s).

The reactive solid used in the higher temperature reaction zone can be of any appropriate type. In the production of boron compounds such as diboron tetrafluoride, solid boron has been illustratively described as a suitable solid reactant. In other embodiments, it may be desirable to use reactive solids other than boron metal for the contacting of $BF_3$. For example, the boron can be present in any suitable boron-containing compound. In a preferred aspect of the present disclosure, the boron-containing compound will be one wherein the boron atoms are not in the highest oxidation state. In one aspect of the invention, the following boron-containing solids or their mixtures may be used for more effective generation of BF in reaction with $BF_3$: (i) boron-containing compounds with stoichiometric formulae, for example, such as $M_4B$, $M_3B$, $M_5B_2$, $M_7B_3$, $M_2B$, $M_5B_3$, $M_3B_2$, $M_{11}B_5$, MB, $M_{10}B_{11}$, $M_3B_4$, $M_2B_3$, $M_3B_5$, $MB_2$, $M_2B_5$, $MB_3$, $MB_4$, $MB_6$, $M_2B_{13}$, $MB_{10}$, $MB_{12}$, $MB_{15}$, $MB_{18}$, $MB_{66}$, where M represents an element of the periodic table with which a boride of certain stoichiometry exists, e.g., $B_4C$ and C (carbon); or (ii) boron-containing compounds with non-stoichiometric formulae. Such boron-containing solids may also be used in mixtures of any two or more boron-containing compounds, wherein each compound in the mixture is independently selected. Mixtures of the compounds within the particle bed may be homogeneous or stratified for optimal reaction design and control.

In one aspect of the disclosure, it may be desirable to match compositions of the reaction zone with the composition of the boron-containing solids. In particular, boron carbides such as $B_4C$ may offer an additional benefit of not introducing an additional element into the reaction zone if the constituent parts and components of the reaction zone are made of carbon or graphite.

The boron-containing solids can for example have a diameter or characteristic major dimension that is in a range of from 1 mm up to 5 cm or more depending on the scale of the reactor apparatus and the retention structure that is used to retain the solids in the casing within the reaction cavity. Retention structures can be of any suitable type or types, including for example screens, grids, rods, offset plates, cups, metal or non-metal wool plugs, etc. The boron-containing solids can be arranged in any suitable manner that permits the BF intermediate to be discharged from the reaction zone so that it is captured in the condensation zone.

After the boron-containing solids are contacted with $BF_3$ at elevated temperature to generate BF as an intermediate, the BF intermediate and unreacted $BF_3$ are discharged from the reaction zone into a condensation zone where the BF intermediate and the unreacted $BF_3$ condense. The condensation zone, for example, may comprise a cold trap, where the BF intermediate and the unreacted $BF_3$ condense on a cooled or chilled surface of the cold trap, with BF reacting with $BF_3$ to form $B_2F_4$.

In one embodiment of the present disclosure, the reactor system is utilized by placing the boron-containing solid reactant inside a casing with openings on its surface, with the bottom of the casing being provided with a retention structure that supports the boron-containing solids and retains them in the interior volume of the casing, while allowing flow of reactive gas through the retention structure. The casing is inserted in a reaction cavity, which may for example be in the shape of a hollow cylinder formed of suitable material such as, for example, quartz or graphite. The inner diameter of such cylinder is larger than the diameter of the casing so that the inner cylinder surface is in spaced relationship to the casing. In a specific arrangement, the casing and cylinder can be arranged coaxially with respect to one another, so that an annular space is formed between them. The cylinder and casing are in direct flow communication with a condensation zone that is cooled by a suitable coolant, such as liquid nitrogen or other heat transfer coolant medium, or other refrigeration source.

In this arrangement, boron-containing solids can be loaded in the casing so as to form a bed of boron-containing solids, with the casing disposed in a reaction zone of cylindrical geometry. This assembly can be suspended by a tube through which boron trifluoride is delivered to the reaction zone, so that the boron trifluoride reacts with the boron-containing solids in such reaction zone, producing a boron fluoride (BF) intermediate.

The BF intermediate and the unreacted $BF_3$ preferably is discharged from the reaction zone into a condensation zone directly. The BF intermediate and the unreacted $BF_3$ in such arrangement condense, for example, on a surface of a cold trap, with BF reacting with $BF_3$ to form $B_2F_4$. Once a sufficient amount of BF, $BF_3$ and $B_2F_4$ has condensed, the reaction is stopped and the condensation zone is brought to higher temperature to allow evaporation of reaction products such as $B_2F_4$ and $B_xF_y$ (higher/polymeric boron fluoride species, wherein x and y have stoichiometrically appropriate values) and unreacted $BF_3$. The $B_2F_4$-containing gas mixture then can be pumped out of the condensation zone and subjected to recovery treatment such as distillation to recover the $B_2F_4$, with $BF_3$ concurrently being recovered and recycled back to the reactor or subjected to other disposition or use.

Recycle of reaction product components from the condensation zone may be useful in specific implementations of the disclosure. For example, $B_xF_y$ components of the reaction product mixture from the lower temperature reaction zone can be subjected to heating, to decompose same to form solid boron as a recovered byproduct of the condensation zone reaction process.

Figure 4:
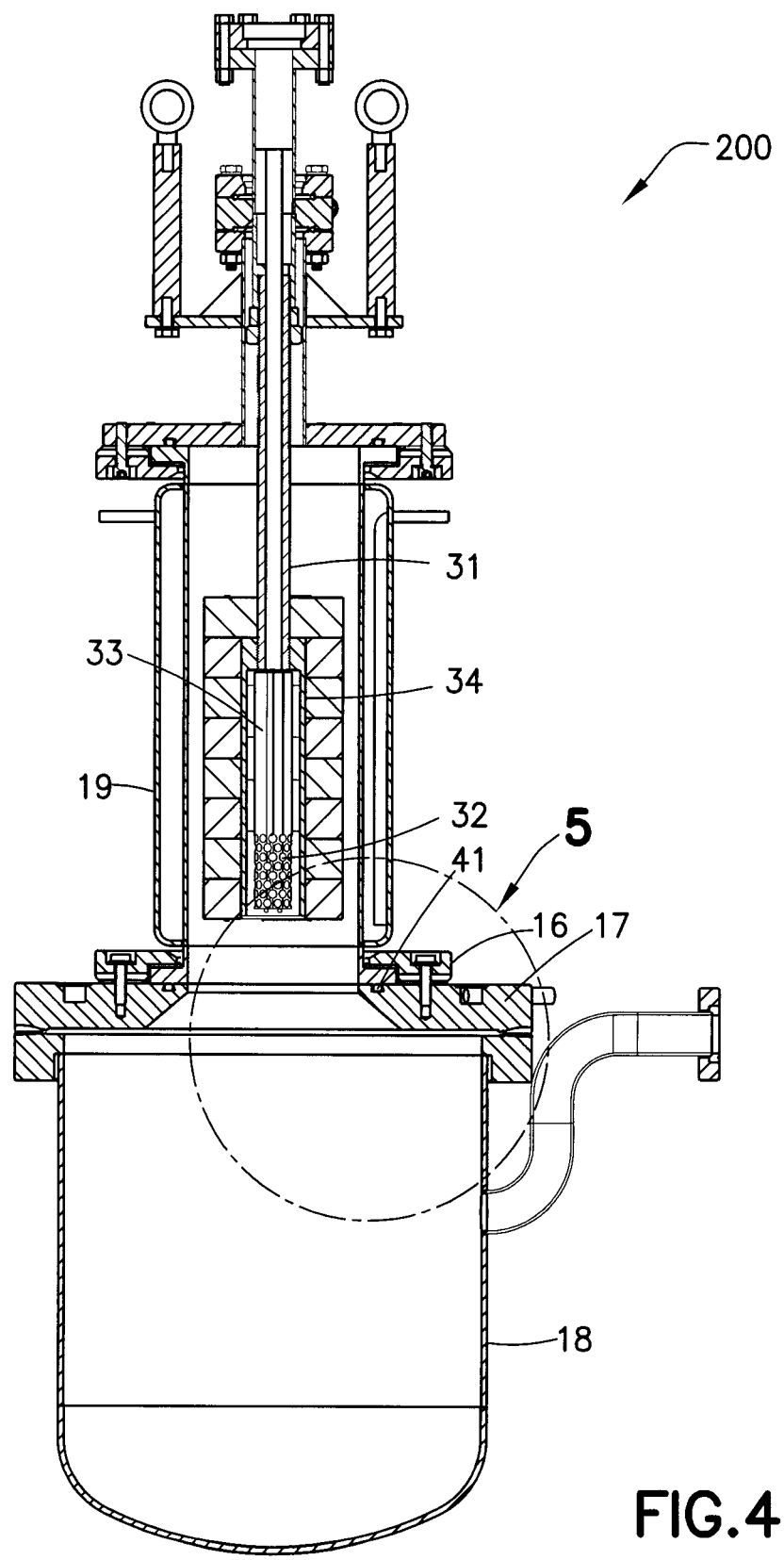
FIG. 4 is a cross-sectional view of a reactor system according to the embodiment of FIG. 2.

In a specific embodiment, the boron-containing solids are loaded in a cylindrical casing that may also be formed of graphite or ceramics, or alternatively of another suitable material of construction, and the casing then is deployed in a cylindrical reaction cavity, preferably so that the casing is centered in the cylindrical cavity, although other non-centered arrangements can also be effected. The casing advantageously is provided with holes in a lower section thereof, so that $BF_3$ enters from the top of the casing, passing through the boron-containing solids and reaching the perforated section where the reaction cavity is located. The resulting BF generated in the reaction zone from the reaction of the $BF_3$ and boron-containing reactants exits the holes of the casing and then flows downwardly into the condensation zone. Clogging at the bottom of the casing and reaction cavity is reduced by the provision of a gap between the casing and reaction cavity. An example is shown in FIG. 4, wherein the casing assembly 31 comprises solid reactant 32, a reaction cavity 33 and a casing 34.

The positioning of the reactor assembly including the casing and the reaction cavity may employ a horizontal or vertical orientation or an angular orientation at any angle between the horizontal and vertical positions of the reactor assembly. The shape of the openings in the perforated casing disposed in the reaction cavity can be uniform or non-uniform in character, and may be circular or may have other geometric shapes, consistent with the objective of maintaining open pathways for flow of boron fluoride and boron trifluoride out of the casing, while concurrently effecting appropriate contact between boron trifluoride and the boron-containing solids. The shape and/or size of the boron-containing solids can be uniform or non-uniform in character.

More generally, the characteristics of the openings in the casing within the reaction cavity, and the morphology, shape, crystallinity and size of the boron-containing solids deployed in the reaction are parameters that can be individually or combinatorially tailored to optimize the reaction between the boron-containing solids and boron trifluoride.

The casing and/or reaction cavity can be advantageously formed of metal, quartz, graphite or other carbonaceous material. Graphite is preferred for the casing for such purpose because heat can be readily resistively generated in such material, such as by oscillating currents induced by a radio frequency (RF) field of an electrical coil that is circumscribingly positioned in relation to the reaction zone, for example, a zone comprising a cylindrical cavity and the casing containing the reactive solids. The RF coil provides a simple and effective arrangement for achieving the elevated temperatures required for reaction of boron trifluoride with the boron-containing solids in the casing holding such solids. The casing as previously described may be foraminous in character, being constructed of a porous sorbent permeable material, or alternatively having one or more openings therein for egress of the intermediate that is formed in the high temperature reaction therein.

Concerning the use of graphite materials for the reactive solid contacting zone through which reactant gas is flowed, and the use of RF coils to resistively heat such graphite materials to reaction temperatures, it will be appreciated that the coil spacing, diameter, shape, use of multiple coils, etc. will influence the geometry and strength of the exerted RF field. The RF coils can be appropriately constructed and arranged to provide effective axial and radial temperature profiles inside the elevated temperature reaction zone, in order to achieve efficient production of the BF intermediate as a reaction product of the reactive solid and reactant gas in the reaction zone, within the skill of the art, based on the disclosure herein.

Although graphite is preferred for construction of the boron solids-containing casing, metals, ceramics or other high temperature materials can be employed, provided that they withstand temperatures of up to 2200° C., and are inert to boron trifluoride across the full temperature range of interest.

For example, the heat source for the high temperature of the reaction zone can be adapted to maintain predetermined temperature in the reaction zone by a heating modality comprising at least one of conduction heating, induction heating, convective heating, resistive heating, and radiation heating. The heat source in such respect can be adapted to maintain temperature in the reaction zone that is effective to prevent deposition and/or condensation of material in the reaction region, e.g., temperature in the reaction zone in a range of from 1000° C. to 2200° C.

Figure 2:
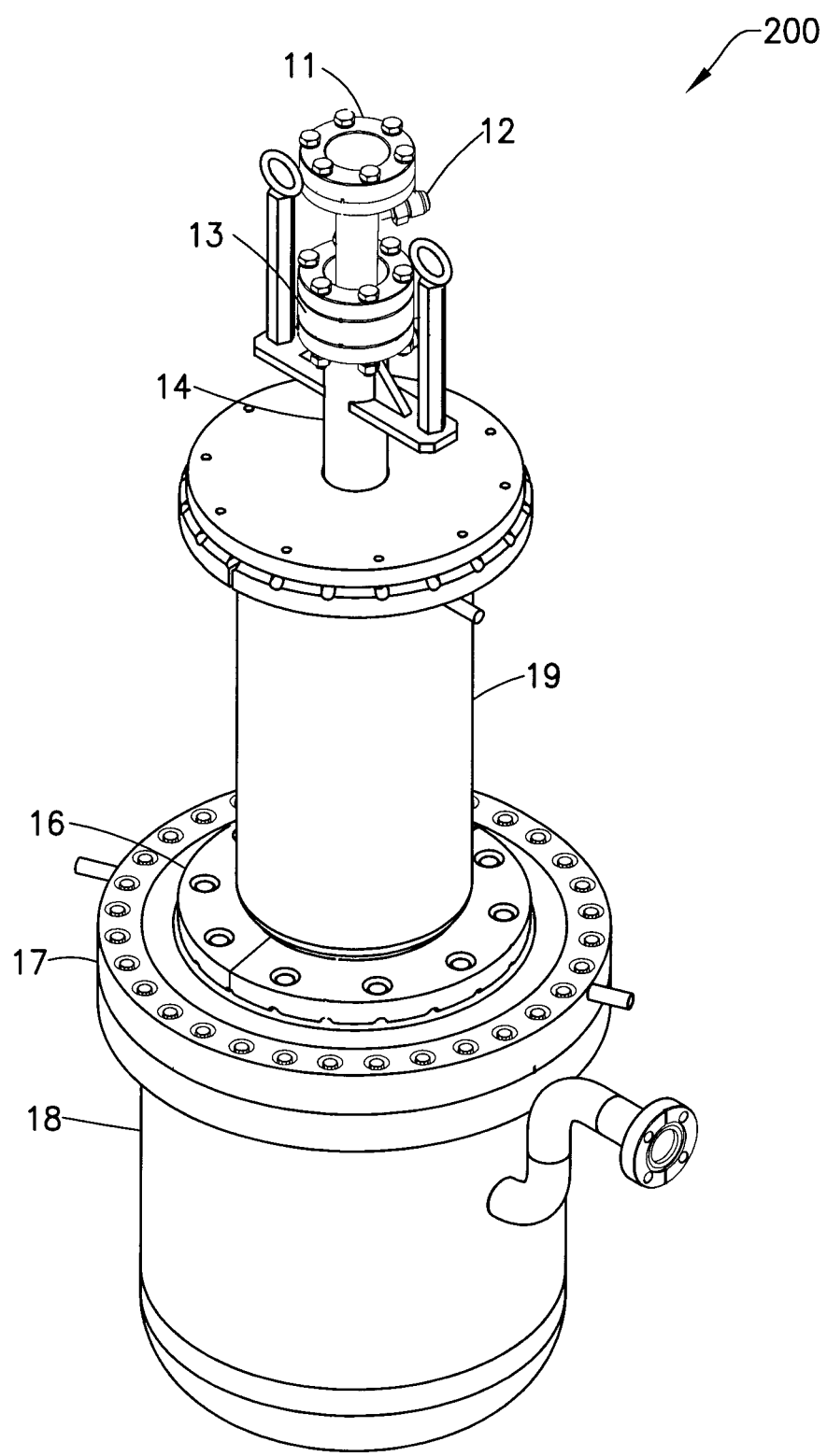
FIG. 2 is a perspective view of the reactor system according to the embodiment of FIG. 1.
Figure 3:
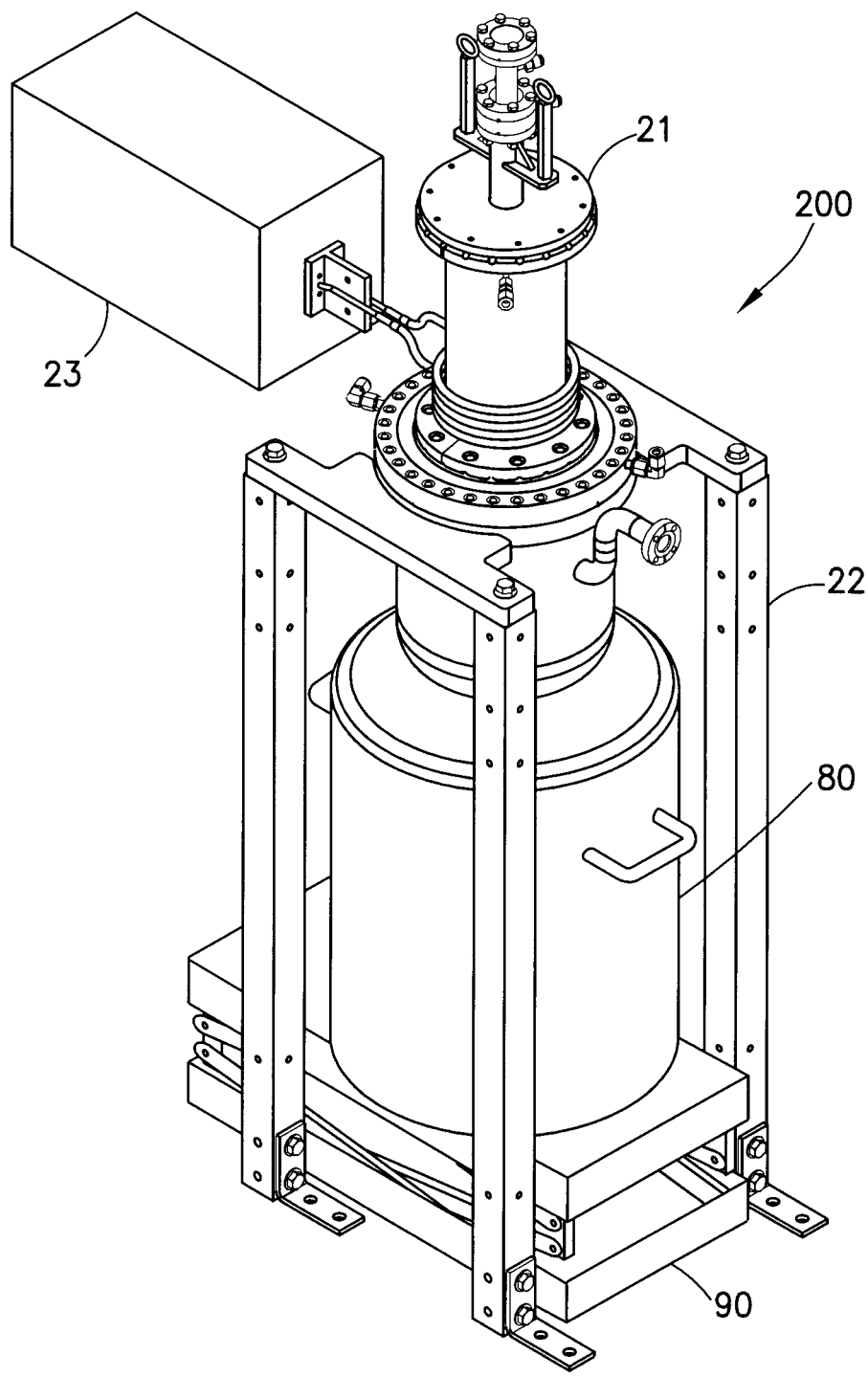
FIG. 3 is a perspective view of an installed reactor system.

The reactor system in one embodiment comprises three major sections. As shown in FIG. 1, the reactor system 200 comprises a top section 1 where the process and purge gases are supplied, a middle section 2 comprising the reaction zone where the high temperature reaction occurs, and a bottom section 3 comprising the condensation zone where products are cooled and condensed at cryogenic temperatures (for example, by liquid nitrogen). The reactor system in this embodiment includes an induction heating system that provides the energy for the high temperature reaction, a cooling water system for thermal management, and a liquid nitrogen dewar for cooling the reactants in a cryogenic temperature range. The liquid nitrogen dewar has an associated hydraulic lift to aid in the control of the temperature of the bottom section of the reactor system. FIG. 2 and FIG. 3 illustrate this reactor system.

As shown in FIG. 2, the top section of the reactor system 200 of this embodiment comprises a view port 11, a gas inlet chamber 12, an adapter flange 13, and a transition chamber 14. The middle section of the reactor system comprises a quartz jacket 19. The middle section also comprises the casing assembly 31 shown in FIG. 4. The bottom section of the reactor system comprises a split flange 16, a bottom flange 17 and a cold trap 18.

As shown in FIG. 3, the installed reactor system including reactor system 200 according to an embodiment of the disclosure comprises a reactor 21, a reactor support 22, a liquid nitrogen container 80, a hydraulic lift 90 and an induction heat station 23.

In an embodiment of the disclosure, a reactor system is provided comprising a reaction zone for contacting a gaseous reagent with a solid material under temperature and pressure conditions effective to form an intermediate species, an opening for allowing an unreacted portion of the gaseous reagent and the intermediate species to exit the reaction zone into a condensation zone, and a seal surrounding the opening sealingly connecting the reaction zone to the condensation zone. In specific embodiments, the opening may variously be constituted by a single opening, or alternatively by a multiplicity of openings, to accommodate discharge of the intermediate species and unreacted gaseous reagent from the reaction region. The opening may be constituted by a lumen or passage, or other structural arrangement enabling the specified discharge of the intermediate species and unreacted gaseous reagent, e.g., to a further reactor in which the intermediate species and unreacted gaseous reagent are further reacted to form final product.

The seal connecting the reaction zone with the condensation zone is selected according to requirements such as chemical compatibility, application temperature, sealing pressure, size and cost. The seal should be capable of sealingly connecting the reaction zone and the condensation zone under conditions of vacuum or super-atmospheric pressures. The seal further will completely surround the opening which allows an unreacted portion of the gaseous reagent and the intermediate species to exit the reaction zone.

The seal may be of any suitable size, shape and character which provides a sufficient seal between the reaction zone and the condensation zone under the pressure and temperature conditions extant during operation of the reaction system. The seal, in one embodiment, will be an O-ring. In a further embodiment, the seal may comprise a perfluoroelastomer material.

In one embodiment, the reaction zone in the middle section of the reactor system may comprise a reactor which is a double walled quartz jacket that is water cooled. In the center of this jacket is the casing or a crucible that is heated for the high temperature reaction. The bottom section or condensation zone of the reactor system is a vessel constructed of stainless steel and is submersed in liquid nitrogen so that the reaction products will condense and solidify on the walls.

By way of example, hydraulic lift 90 as shown in FIG. 3 may be used to move the dewar or vessel containing the liquid nitrogen or other material which is capable of cooling at cryogenic temperatures up and down as required for cooling and condensing the reactants in the condensation zone. This movement may be automated according to predetermined requirements for effective cooling and warming as needed. For example, the cryogenic temperature range is controlled by use of a hydraulic lift configured to translate a vessel containing material that can cool at cryogenic temperatures, in a selected one of upward and downward directions, between an uppermost position and a lowermost position.

In an embodiment wherein a double walled quartz jacket is used for the reaction zone and a stainless steel cylinder is used for the condensation zone, to maintain the seal between the quartz and metal components under both vacuum and super-atmospheric pressures, a perfluoroelastomer (FFKM) O-ring is used. To protect this O-ring from both the high and low temperature extremes associated with the reaction zone or heated crucible and the condensation zone, or cooled lower part of the reactor, a water channel can be used to minimize the temperature extremes to which the O-ring would otherwise be exposed. These temperature extremes would otherwise reduce the life of the O-ring or prevent it from maintaining the seal under all process conditions.

Figure 5:
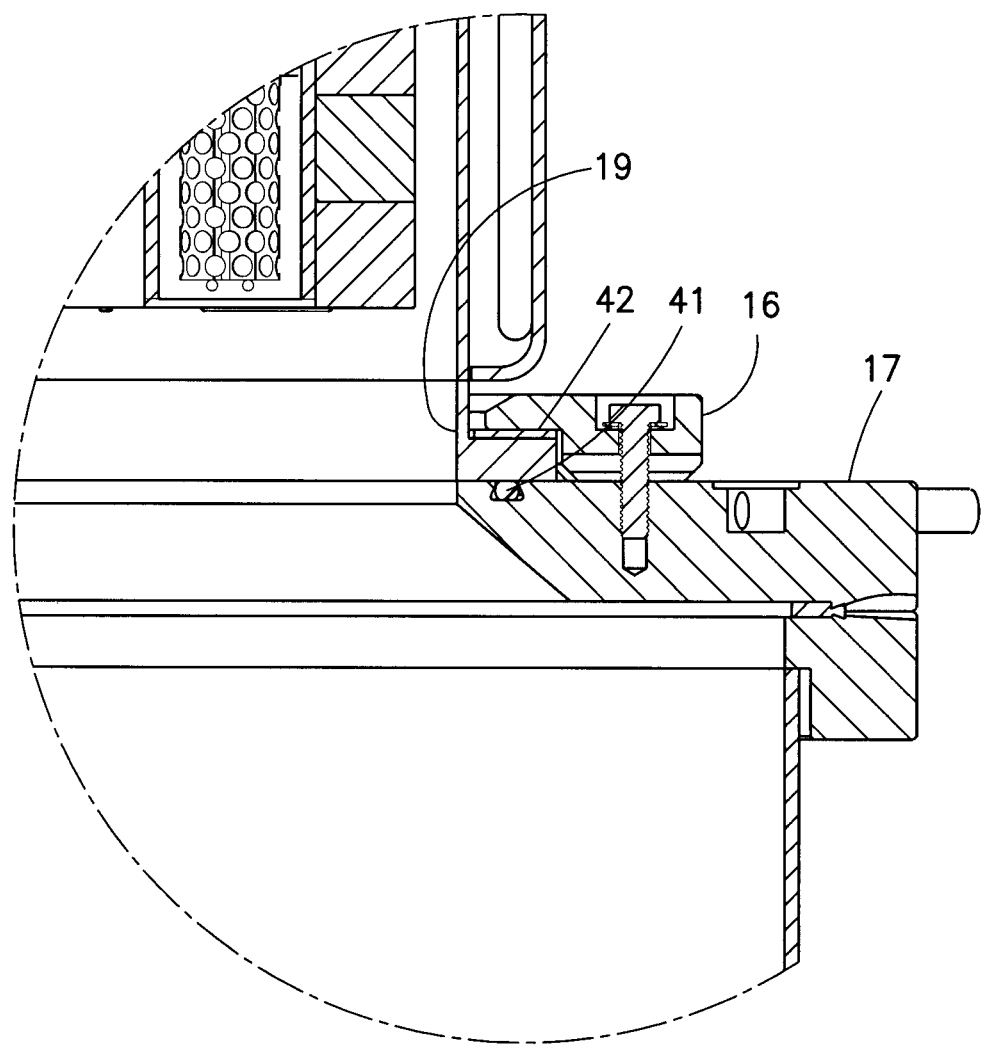
FIG. 5 is a magnified view of the split flange area of the reactor system illustrated in FIG. 4.

To physically maintain the compression on the O-ring, a split flange constructed of a high performance engineering thermoplastic may be used. The thermoplastic may for example comprise 40% glass-filled polyphenylene sulfide, a bismaleimide, polysulfone, or other high performance engineering thermoplastic. FIG. 4 is a model cross-section view of a reactor system 200 according to an embodiment of the disclosure. FIG. 5 is an enlargement of one section of the reactor system 200 of FIG. 4. As shown, the o-ring 41 is disposed below split flange 16 on bottom flange 17. In the magnification of FIG. 5, the O-ring 41, split flange 16, bottom flange 17 and a cushion layer 42 are arranged above cold trap 18 (FIG. 4) such that the compression on the O-ring is maintained according to the requirements for operation of the reactor system. Quartz jacket 19 is also shown in FIG. 4 and FIG. 5.

The composite material for the split flange was selected for its ability to operate in the elevated temperature reaction zone and not couple with the RF field generated by an induction heating system. The bolts used for securing the split flange are brass, so as to minimize the coupling effect as well. Between the split flange and quartz jacket as well as between the brass bolts and the split flange, a fluorocarbon, such as polytetrafluoroethylene, may be used both as a cushion and to provide an additional layer of thermal isolation. In one embodiment, nitrogen gas is blown through channels in the split flange to provide cooling to the bolts as well as to displace oxygen from the region directly around the O-ring seal.

In an embodiment of the disclosure, the water channel allows water to be circulated through the bottom flange. The temperature of the water is controlled to ~21° C. using a heat exchanger. During the high temperature step of the reaction the water is used to draw heat out of the bottom flange and away from the o-ring to protect it from being over heated. Overheating the o-ring may cause damage. After the high temperature step when the bottom of the reactor is still in liquid nitrogen, the water channel is used to prevent the flange and more specifically the o-ring from being over cooled. Overcooling the o-ring can cause it to lose its integrity and form a leak.

In a separate embodiment, the reaction zone may comprise a metal reactor, i.e., a reactor wherein all the materials of construction are metal, such as the casing and reaction cavity. In this embodiment, metal seals may be used and the heat source may be located within the reaction zone. For example, the heat source can be adapted to maintain predetermined temperature in the reaction zone by a heating modality comprising at least one of conduction heating, induction heating, convective heating, resistive heating, and radiation heating. The heat source in such respect can be adapted to maintain temperature in the reaction zone that is effective to prevent deposition and/or condensation of material in the reaction region, e.g., temperature in the reaction zone in a range of from 1000° C. to 2200° C. The all-metal reactor will be able to withstand high pressures and shock that may occur due to the high temperature gradient that exists between the reaction zone and condensation zone or from external factors, such as system or process failures.

Downstream from the high temperature reactor in which boron trifluoride and elemental boron or boron-containing solids are reacted to form boron monofluoride, the condensation zone comprises a lower temperature reactor, e.g., a cold trap, whose size, shape and character are additional parameters that can be selectively varied. These parameters may be adjusted to optimally achieve more uniform deposits of material from the intermediate-containing stream flowed from the higher temperature reaction zone to the condensation zone, while maintaining suitable vacuum conditions in the condensation zone. Where a cold trap is used, for example, extended surface structures, e.g., cold fingers, fins, or the like, can be provided in the cold trap to increase surface area for condensation of material that is present in the intermediate-containing stream flowed from the higher temperature reaction zone to the cold trap.

In the condensation zone or lower temperature zone employed for condensation of solid intermediate (BF), liquid nitrogen has been described as an illustrative coolant. Other refrigerant media can be employed in specific implementations of the disclosure, including, without limitation, refrigerants such as liquid argon, liquid oxygen, liquid helium, etc.

The cold trap can be periodically cleaned with water to remove solid boron fluoride residues, e.g., higher/polymeric boron fluoride species of the formula $B_xF_y$, wherein x and y have stoichiometrically appropriate values. In operation, the cold trap can be cooled with liquid nitrogen or other suitable cryogen. Temperature at the bottom of the cold trap can be on the order of $-196°$ C. when liquid nitrogen is used as the coolant.

In one embodiment, the cold trap may also be operated to pre-condense boron trifluoride therein, and thereby increase production of diboron tetrafluoride when the intermediate-containing reaction mixture is subsequently flowed to the cold trap.

The reaction product mixture that is extracted or off-loaded from the cold trap may contain 5%, 10%, 20%, 30%, 40%, 50% or higher concentrations of diboron tetrafluoride, with the remainder being boron trifluoride and trace amounts of volatile heavy boron fluorides.

The reaction system of the present disclosure can be deployed with various specific features and in various specific arrangements for high-efficiency continuous operation. For example, instead of a reaction zone containing a single reaction cavity and a single casing loaded with boron-containing solids, high temperature reactor assemblies can be provided with multiple, independent reaction cavities and multiple casings that can be operated, maintained, and refilled independently of one another.

Considering the condensation zone used to produce diboron tetrafluoride by reaction of boron monofluoride and boron trifluoride, such zone can be provided as a cold trap comprising a sufficiently cooled surface element, such as a plate member or a plate member with extended surface, which is conveyed into a cavity of the cold trap to receive and condense BF, $BF_3$ and $B_2F_4$. Once such receiving plate member is sufficiently coated with condensed material, it is conveyed out of the condensation zone and replaced with a fresh receiving plate member, e.g., by a suitably configured conveyor or other transport system.

In another arrangement, the high temperature assembly can be positioned over a low-temperature compartmented cold trap within a reactor system. Such assembly can be translated in any suitable manner to different compartments of the reactor system, with the specific cold trap compartment being arranged for deposition of BF, $BF_3$ and $B_2F_4$ in an isolated state relative to the rest of the reactor (e.g., with the rest of the reactor undergoing cleaning or "off-loading" of condensed products that have already been deposited in other cold trap compartments).

After the $B_2F_4$ product is formed in the condensation zone, the next step in $B_2F_4$ production is extraction of a $B_2F_4$-containing gas mixture from the reactor for further distillation purification and recovery of $B_2F_4$.

More generally, as contemplated by the present disclosure, boron-containing compounds of widely varied types can be synthesized utilizing boron-containing solids with which reactant gases are contacted, and can include any number of boron atoms. In one embodiment, the boron-containing compound contains at least two boron atoms. In another embodiment, the boron-containing compound contains from 2 to 80 boron atoms, including diboron compounds such as $B_2F_4$, triboron compounds, tetraboron compounds such as $(F_2B)_3BCO$, pentaboron compounds, hexaboron compounds, septaboron compounds, octaboron compounds, nonaboron compounds, decaboron compounds, undecaboron compounds, dodecaboron compounds, etc., up to B80 compounds such as B80 analogs of fullerenes.

In other embodiments, the boron-containing compound can contain 2, 3, 4, 5, 6, 7, 8, 9, 10, or 11 boron atoms. Additional embodiments may comprise cluster boron compounds. In still other embodiments, the boron-containing compound can be a diboron compound. In other embodiments, the boron-containing compound can be defined in terms excluding certain compounds, e.g., as comprising diboron compounds other than diborane. It will therefore be appreciated that the present disclosure contemplates a wide variety of classes of boron-containing compounds, within the broad scope of the disclosure, that may be variously specified, in inclusive or alternatively in exclusionary specification thereof.

According to an embodiment of the present disclosure, a recovery zone may be deployed downstream from the condensation zone for recovering the reaction product and unreacted $BF_3$ gas. In such embodiment, after $B_2F_4$ production in the condensation zone, the condensed material is warmed to form a gas mixture. The gas mixture from the reactor is extracted for further distillation of $B_2F_4$. Such gas mixture obtained from the reaction system typically contains $B_2F_4$, $BF_3$ and volatile heavy boron fluorides ($B_xF_y$). Normally, $B_xF_y$ content is 1-2% maximum; however, some $B_xF_y$ species may become unstable and trigger $B_2F_4$ decomposition. It is highly desirable to either (i) prevent $B_xF_y$ extraction from the condensation zone of the reaction system, or (ii) remove these $B_xF_y$ species during product extraction or recovery so that only $B_2F_4$ and $BF_3$ are captured. Additionally, it is important to prevent migration of any particles from the reactor down the transfer line into a collection vessel since such particles can damage valves and other components of the system.

In one embodiment, the recovery zone is operated to achieve extraction of the gas mixture from the condensation zone for further collection/distillation of $B_2F_4$, by gradual warming of the condensation zone to volatilize condensed $BF_3$ and $B_2F_4$. In this arrangement, the gases are transferred into a collection vessel at cryogenic temperature, employing a pressure drop between the condensation zone and the vessel. Since $B_xF_y$ species have lower than $BF_3$ and $B_2F_4$ vapor pressures at any given temperature, an inline low temperature trap may be employed for condensing the $B_xF_y$ species from the gas mixture stream. The temperature and the trap inlet pressure chosen for this purpose should be selected to prevent excessive condensation of $B_2F_4$ or $BF_3$.

For example, at −57° C. $B_2F_4$ exhibits ~160 Torr pressure, which allows the reactor to operate up to this pressure without condensing $B_2F_4$ in the trap.

In one embodiment, the process for extracting crude product, $BF_3/B_2F_4$, from the reactor relies on a pressure differential between condensation zone of the reactor and the collection cylinder or vessel. The pressure differential is established by cooling the collection vessel, preferably a one gallon stainless steel cylinder, by partially submerging it in liquid nitrogen. By doing this the $BF_3$ and $B_2F_4$ will condense in the cylinder resulting in such pressure differential between the reactor and collection vessel allowing material to flow. In the reaction system, the height of the dewar is at a set height to allow the condensed gases to evaporate. However, the temperature of the condensation zone may be controlled in any manner that sufficiently provides a desired temperature, pressure and flow rate. For example, by automating the height control of the dewar, the rate of evaporation can be controlled.

The recovery zone may further comprise a filtration zone, whereby particles in the system may be removed by appropriate filters. Such filters include any type which may be conveniently placed into the gas-carrying lines of the system. For example, the filters may be inline filters including a 15 μm filter element.

To expedite recovery or extraction of the gas mixture for further collection/distillation of $B_2F_4$, a carrier gas may be used. By way of example, in one embodiment helium is blown into the reactor (i) to facilitate warm up of the condensed gases, and (ii) to increase material flow through the transfer line into the collection vessel.

In various embodiments, faster extraction rates may be achieved by selective thermal control of the reactor system. In one embodiment, the condensation zone is allowed to warm up naturally and its pressure is controlled by lowering or increasing the level of a dewar with liquid nitrogen. This, however, may create temperature gradients resulting in poor control of vaporization rate, so that the content of the gas mixture may not be sufficiently controlled during extraction. In one preferred embodiment, an improved thermal control arrangement is used to effect preferential removal of $BF_3$ and $B_2F_4$ without extracting other $B_xF_y$ species. This may for example be achieved by maintaining a uniform temperature of the entire low temperature assembly of the reactor system through the warm up step, and by limiting the temperature to a predetermined temperature at which the other (undesired) $B_xF_y$ species do not volatilize. The utilization of this approach can be further augmented with the use of a carrier gas, low temperature traps and filters to achieve particularly beneficial results.

Substantial amounts of heavy boron fluorides, $B_xF_y$, may be generated as byproducts in the production of $B_2F_4$. Major amounts are usually retained in the reactor system components and traps; however, smaller quantities are scattered throughout the system. Accumulation and spread of the heavy $B_xF_y$ species can result in a number of unwanted effects (line clogging, valve failure, etc.) but more importantly excessive build-up of the heavy $B_xF_y$ species in the reactor can elevate reactor pressure during the high temperature reaction step, and prevent adequate cooling of incoming BF and $BF_3$, thereby lowering $B_2F_4$ throughput and yield. To ameliorate this circumstance, in one embodiment, the heavy $B_xF_y$ species are hydrolyzed and removed from the reactor system. This can be done manually, but is a laborious and hazardous task. Preferably, an automated method is used to achieve high productivity. Various methods may be employed to facilitate residue removal. In one approach, initial hydrolysis of the heavy $B_xF_y$ species with water vapor is followed by water wash and drying with warm gas. In another approach, thermal decomposition of $B_xF_y$ is achieved by baking out the reaction zone or any component therein, with recycling of the resultingly produced $BF_3$ and boron. In another approach, decontamination of $B_xF_y$, is effected by reacting the heavy $B_xF_y$ species with an active compound such as $XeF_2$, $F_2$, $NF_3$, $O_2$, $O_3$, CO, etc., to form a residue, followed by mechanically removing the remaining residue. In another approach, the heavy $B_xF_y$ species may be reacted with halogen-containing agents to volatilize the residue. Any of these approaches to minimize the effects of $B_xF_y$ in the system may be used, as a single method or in combination(s).

The reactor system, including a high temperature assembly for solid/fluid reaction to form the intermediate, and a lower temperature assembly such as a cold trap for further fluid reaction with the intermediate, may have any suitable geometry, size and scale, in which the reaction zone and the cold trap are in fluid flow communication to permit flow of a gas mixture including the intermediate product into the cold trap zone for further reaction to form the final product.

An apparatus and reactor system and method for preparation of a compound or intermediates thereof from a solid material is disclosed in U.S. patent application Ser. No. 13/219,706, filed Aug. 28, 2011, the disclosure of which is hereby incorporated herein by reference in its entirety, for all purposes.

Various reactor configurations are contemplated within the scope of the present disclosure, wherein boron trifluoride is reacted with elemental boron or boron-containing solids at high temperature to form boron monofluoride, and the resulting boron monofluoride is reacted with boron trifluoride at low temperature, e.g., cryogenic temperature, to form diboron tetrafluoride ($B_2F_4$) and heavier boron fluoride compounds. Since the reaction of boron trifluoride and elemental boron is reversible, the reactor configurations are desirably adapted to maximize the production of the intermediate boron monofluoride in any suitable manner that controls the corresponding reaction to favor BF production.

In addition to single-pass (once through) flow arrangements for contacting of boron trifluoride gas with boron-containing solids, the present disclosure contemplates arrangements in which boron trifluoride is recirculated, and augmented by make-up boron trifluoride introduced in a recirculation loop, to achieve high-rate continuous production of boron fluoride (BF).

In the production of $B_2F_4$ based on reaction between $BF_3$ and boron forming BF intermediate, it may be advantageous to utilize $BF_3$ recycled from previous $B_2F_4$ production cycles, for example, in a recycling zone. Using such approach, however, the amount of $B_2F_4$ produced may be reduced due to impurity in the recycled $BF_3$. Although the nature of such impurity is not fully understood, it is believed that the impurity may be generated from a precursor that itself is relatively volatile and is extracted from the reaction system along with $BF_3$. The exact mechanism of $B_2F_4$ throughput suppression by the impurity, although not fully understood, is believed to relate to the inhibiting action of the impurity on the reaction between $BF_3$ and boron.

A simple freeze-pump-thaw purification of recycled $BF_3$ has been demonstrated to improve $B_2F_4$ throughput by 30-40%. Freeze-pump-thaw methods, for example, may be used for fractionation of a mixture composed of compounds with substantially dissimilar vapor pressure and low miscibility in each other. For instance, nitrogen and oxygen could be effectively removed from a number of solvents by freezing them with liquid nitrogen and them pumping on the solvent while allowing it to melt slightly for some time. Such procedure allows purification of a solvent from air component to high degree.

The same method may be employed for purification of recycled $BF_3$. A working hypothesis is that an impurity is generated during $B_2F_4$ process that migrates along with $BF_3$. The impurity is a precursor for another volatile chemical that inhibits the reaction rate between $BF_3$ and boron. Use of a single freeze-pump-thaw purification of recycled $BF_3$ may improve $B_2F_4$ throughput by 30-40%. In such approach, the vessel with recycled $BF_3$ is cooled to appropriate temperature by an appropriate refrigerant, e.g., cooling to cryogenic temperatures, such as temperature of $-196°$ C. by liquid nitrogen, followed by pumping of the vessel head space for a predetermined time, after which the vessel is warmed up. Vessel temperatures, rates of cooling and warming, as well as the number of cooling/warming cycles, may be chosen to optimize $BF_3$ purity and/or reduce purification time.

The reactor system of the present disclosure may employ any suitable monitoring and control components, assemblies and arrangements, to achieve desired operational conditions during processing of feed gas for contacting with the reactive solid to form the intermediate product, and subsequent reaction of the intermediate to obtain final product.

For example, the pressure of the cold trap can be monitored to ensure that consistent low vacuum conditions are maintained in the trap, and flow controllers such as mass flow controllers, flow control valves, restricted flow orifice elements, gas flow regulators, pressure switches, etc., may be employed to regulate flow of reactant gas to the higher temperature reaction zone for contacting with the reactive solid. In general, any suitable monitoring and control arrangements may be implemented, which serve to beneficially operate the reactor system, so that intermediate and final products of appropriate character are obtained.

Accordingly, monitoring and control components, assemblies and arrangements can be employed to control temperature and pressure in the reactive solid contacting reaction zone, as well as in the intermediate product processing zone that is utilized to produce the final product. Alternatively, other monitoring and control modalities may be employed to modulate other system variables and parameters, to achieve beneficial operation of the process system.

The reaction system of the disclosure can include a process control system that is constructed and arranged to establish and maintain selected temperature and pressure conditions in the reaction region, e.g., pressure in the reaction region in a selected range, and/or temperature in the reaction region in a selected range. In various embodiments, temperature in the reaction region may be in a range of from $1000°$ C. to $2200°$ C. The pressure in the reaction region can be maintained at any suitable level. In various embodiments, the pressure in the reaction region can be in a range of from $10^-6$ to 1,000 torr, and more preferably in a range of from 0.10 torr to 10 torr. A pressure gradient exists in the reaction region, from an upstream portion to a downstream portion thereof. In a specific example, wherein the reaction region is in an interior volume of a reactor housing of cylindrical form, the pressure at the exit of the cylinder in various embodiments can be in a range of from $10^-2$ to $10^-3$ torr.

The flow rate of the gaseous reagent can be selected to provide appropriate levels of production of the intermediate product. In one embodiment, wherein the gaseous reagent is boron trifluoride, the flow rate can be in a range of from 500 sccm to 1200 sccm, or even higher with more efficient cooling, and the orientation of flow can be varied to optimize contact with the reactive solid. With scale-up to large size reactors, correspondingly larger flows of $BF_3$ can be utilized.

In order to efficiently employ the reactor system of the present disclosure, down time associated with the cleaning of the reactor system should be reduced or minimized Notwithstanding the low incidence of deposits on surfaces of the high temperature reactor that is used to form boron monofluoride by reaction of solid boron with boron trifluoride, some residues will form in the reactor and accumulate over long periods of operation, requiring periodic cleaning of the reactor. Such cleaning may be effected in any suitable manner, and with any suitable cleaning reagents. In various embodiments, cleaning of the reactor surfaces can be carried out with vapor-phase cleaning reagents such as fluorine, xenon difluoride, nitrogen trifluoride, and the like, with or without plasma activation of such cleaning agents.

The condensation zone or lower temperature reaction zone, in accordance with the present disclosure, can be augmented in various ways, to remove specific components of the reaction product mixture, such as species that may be deleterious to downstream pumps, compressors or other flow circuitry components. For example, multiple traps may be provided for product recovery.

According to one embodiment, cleaning of the reactor system may be accomplished by the use of double valves at each connection point. By way of example, double valves may be used at the connection point for the process gas, at the connection point for the purge gas and for the connection point for the product extraction. On FIG. 7, described below, the valves would be located next to AV10, AV11 and MV05. When the cleaning takes place, the connections between the valves are separated and the reactor hardware can be relocated to a separate area where it can be cleaned offline, if desired. While the used system is being cleaned up, a spare, clean system can be reinstalled and used to continue to produce the product material.

Alternatively, the system may be configured in a manner enabling water or other cleaning solutions to be injected into different parts of the system to clean the parts in place. This arrangement allows all the byproducts of the cleaning process to be contained and directed to a scrubber system and/or drained from the system, to capture the waste.

The advantages and features of the disclosure are further illustrated with reference to the following description, which is not to be construed as in any way limiting the scope of the disclosure, but rather as illustrative of embodiments of the disclosure in specific applications thereof.

Figure 7B:
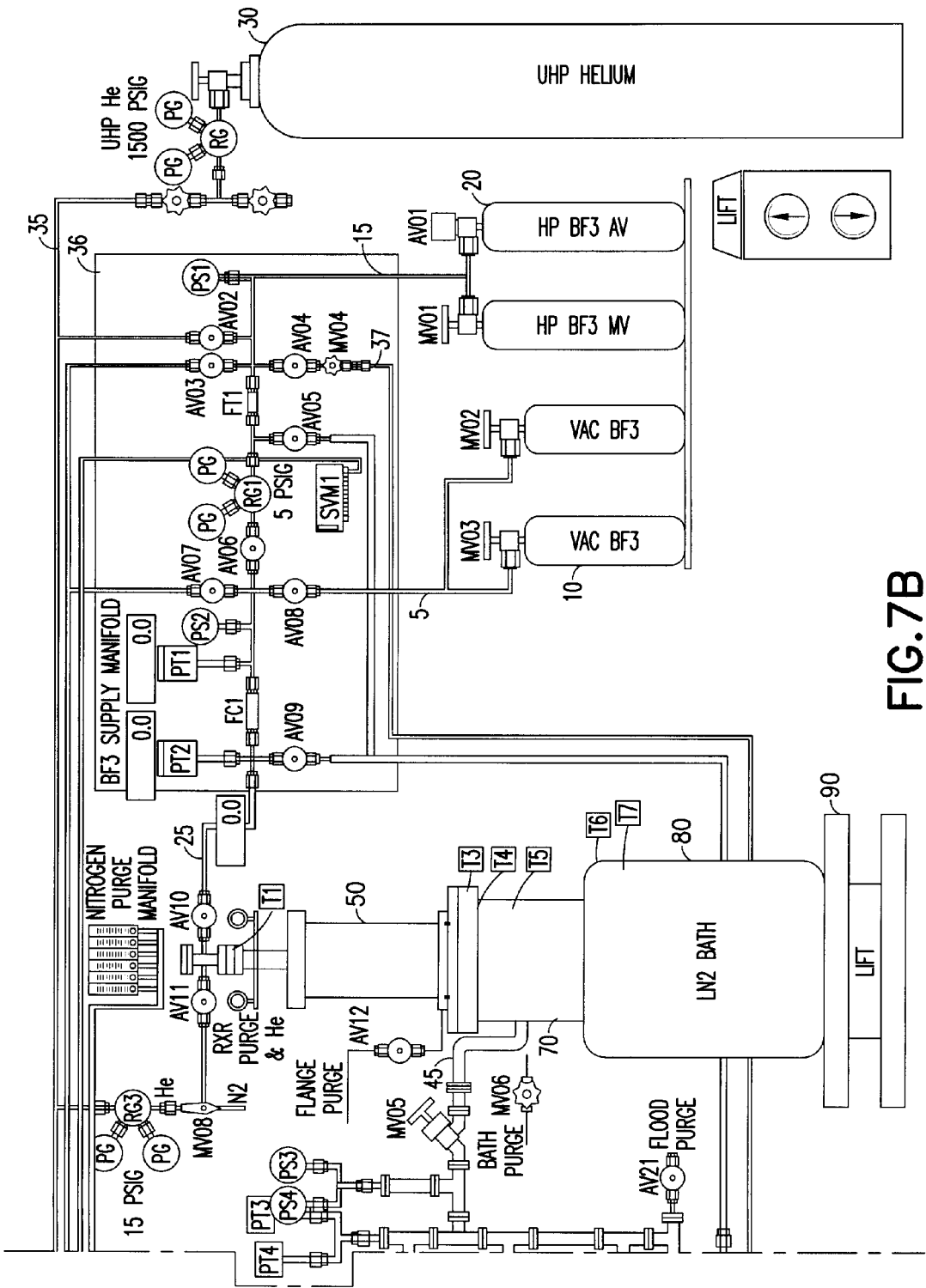
FIG. 7 is a process diagram of an integrated reactor system for reacting a solid reactant with a fluid, according to an embodiment of the disclosure.

FIG. 7 is a process diagram of an integrated reactor system according to one embodiment of the present disclosure. The process diagram includes a reactor system and the other components of an integrated system for the recovery and production of $B_2F_4$. The process control devices are represented as shown. The process flow for producing a crude $B_2F_4$-containing material (a $BF_3/B_2F_4$ mix) involves flow of $BF_3$ gas from a supply cylinder and delivery of the gas to a reactor at a controlled rate of flow using a mass flow controller. In the reactor, the $BF_3$ gas reacts with the metallic boron pieces that have been loaded into a crucible that is heated in the middle section of the reactor. The products of the reaction of $BF_3$ gas and the boron are captured in the bottom of the reactor, which is cooled with liquid nitrogen. Once this high temperature reaction step is completed, the $BF_3$ gas flow is stopped, the liquid nitrogen bath is lowered, and the reaction products are allowed to warm up. Gas is extracted from the bottom of the reactor as it warms up and is directed through a cold trap, then a filtration zone, and finally collected in a capture cylinder. Additional equipment and piping as shown are included for evacuating, purging, and leak checking the system.

As shown in FIG. 7, $BF_3$ gas from a supply cylinder or cylinders 10 or 20 flows via lines 5 or 15 into $BF_3$ gas supply zone 36 and then to the reaction zone by flow through line 25 to the reactor 50. The $BF_3$ gas supply manifold contains appropriate flow controller, FC1, pressure transducers, PT1 and PT2, pressure regulator RG1, pressure switches, PS1 and PS2, pneumatic valves AV02-AV09, manual valve MV04, particle filter FT1, and solenoid valve manifold SVM1. The solenoid valve manifold is a set of pneumatic valves that receives an electrical signal from the control box that is used to actuate the process valves.

A mass flow profile may be used to control the amount of $BF_3$ that is required for the reaction to take place. The system includes a mass flow controller FC1, two transducers, PT1 and PT2, and a dual stage regulator RG1. The system uses HP (high pressure) $BF_3$ and/or VAC $BF_3$ as a source from cylinders 10 or 20. The outlet pressure from the manual pressure control is maintained at ~20-22 torr as monitored using the pressure transducers. The $BF_3$ flow from the HP cylinder is controlled by a dual stage regulator RG1 such that the mass flow controller inlet pressure is on the order of 650 torr. The HP $BF_3$ cylinder may contain recycled $BF_3$ from the reaction, formed as a useful by-product. Waste gas may be vented in vent line 37.

A remote heat station (not shown) can be used to heat the reaction zone. Other heater arrangements can be employed, such as inductive heating coils (not shown) surrounding the reactor 50 to provide heat to the reaction zone. Reactor 50 contains reactant boron metal as a solid starting material that is manually loaded into the reactor prior to sealing the system for each run. The integrated system can be run as a batch operation.

In operation, $BF_3$ gas flows into reactor 50 where it reacts with the boron metal at high temperature to form an intermediate, BF. BF and other products of the reaction in the reactor are captured in condensation zone 70 and cooled with liquid nitrogen. Hydraulic lift 90 raises and lowers the liquid nitrogen bath 80 as needed to cool the reactants in the condensation zone. The reactor is maintained at −195° C. during the high temperature run, e.g., by an auto liquid nitrogen transfill method. In this method, a liquid nitrogen dewar having ~180 L of liquefied nitrogen is connected with a dispensing line (e.g., a Ratermann Cryogenic dispensing line) fitted with a frit at its end. The line is operated in accordance with a PLC program that controls dispensing of liquid nitrogen to maintain a desired temperature profile of the low temperature assembly.

After the products of the reaction are cooled, the $BF_3$ gas flow is stopped and the hydraulic lift 90 lowers the nitrogen bath 80 and the reaction products are allowed to warm up. After the reaction products warm up to a predetermined level, the products are directed through line 45 to a cold trap 46.

Figure 6:
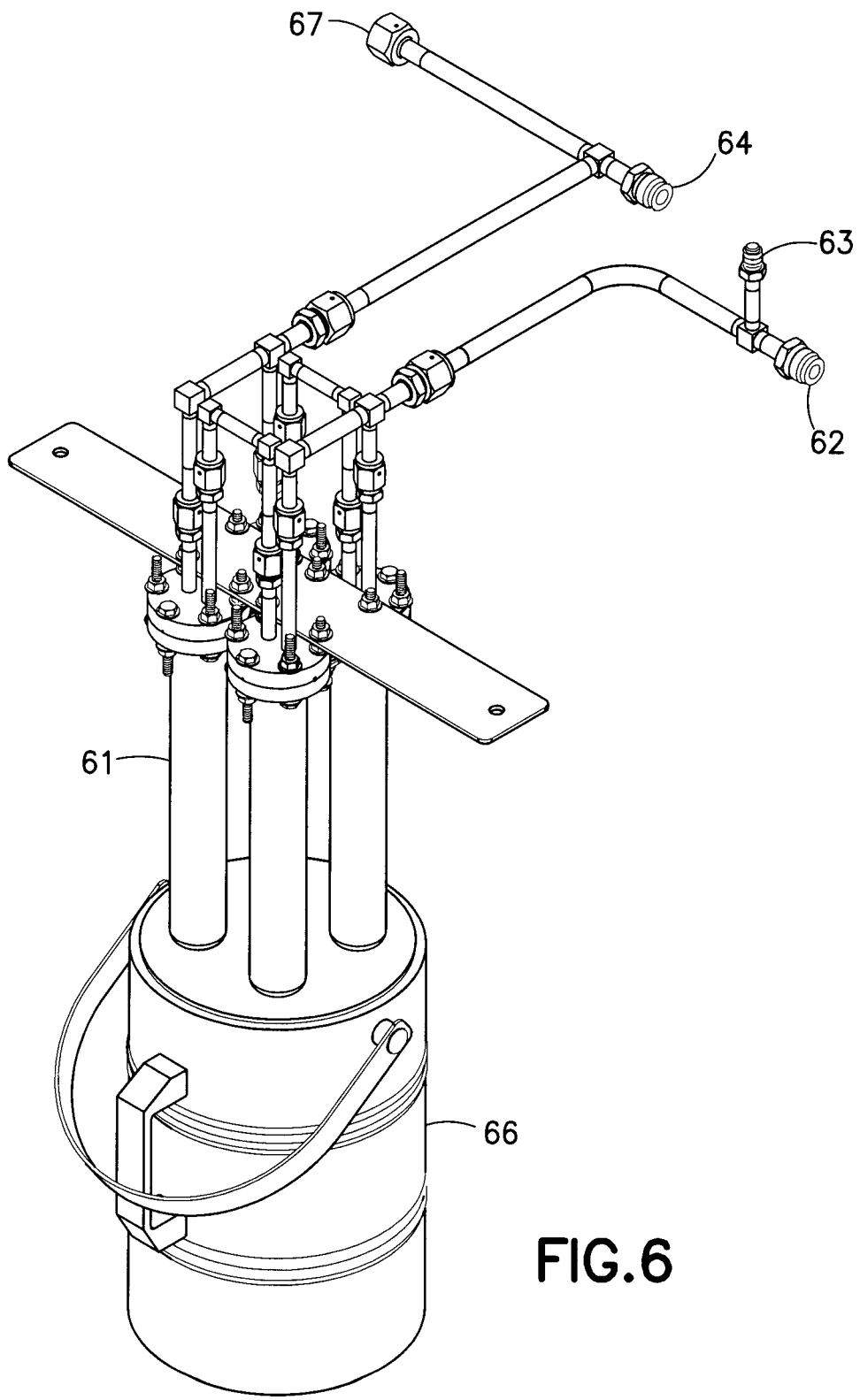
FIG. 6 is a perspective view of an illustrative trap configuration according to an embodiment of the disclosure.

Cold trap 46 is illustrated in FIG. 6. The cold trap is used to prevent heavy boron fluoride materials from migrating from the main reactor vessel to the collection cylinder. FIG. 6 shows the configuration of one cold trap according to an illustrative embodiment of the present disclosure. The cold trap assembly 61 comprises an inlet 62 to the cold traps from the reactor zone, a purge gas inlet 63, a trap outlet 64 to the filtration zone, a trap outlet 67 to a vent and dewar 66. The dewar 66 holds a slush that has been cooled with dry ice or liquid nitrogen to obtain a temperature that is favorable for trapping out the heavy boron fluorides while allowing the $BF_3$ and $B_2F_4$ material to pass through to the collection cylinder 100.

As shown, there are 4 traps in a series/parallel configuration that offer alternate paths for the gas to flow in the event that a line becomes restricted. The configuration of the system will be optimized based on trapping efficiency. Parameters that may vary include the temperature of the cooling solution and the geometry of the traps. To further control the process, a chiller (not shown) may be used to more accurately control the temperature of the traps or to adjust the temperature at different stages of the process to maximize yield and throughput.

After passing through the cold trap 46, the product flows through line 55 into filter zone 58 containing filters 56 and 57.

The filtration system includes two pressure transducers (PT6 and PT7) that measure inlet and outlet pressures as high as 5000 torr (i.e., pressure drop across the filter element) and two inline filters 56 and 57 are arranged in parallel, with a 15 um filter element. During the crude material (reaction product mixture of $B_2F_4$, $BF_3$, $B_xF_y$) transfer, the mixture flows through one of the selected filters to remove any solid particulates entering the crude collection cylinder 100 that could otherwise constitute or contribute to a clogging problem. The pressure drop is measured across the filter. In the case of a new filter element, the pressure differential (delta P) is ~30-40 torr, whereas an old/used filter may have a delta P of ~40-70 torr. If there is a clog in the filter, the control elements and control program operate to allow the filters to be switched during active processing without stopping the crude flow. The filtration system includes appropriate equipment elements for conducting flow through the filters, including valves AV23-AV31, particle filters FT2 and FT3, pressure switches PS7 and PS9, valve MV07, pressure regulator RG and SVM2.

After filtration, the product gas flows via line 65 and is finally collected in collection cylinder 100 and removed via outlet line 75. Inlet 85 may be used to flush the system with nitrogen. Byproducts of the reactions within the reaction system are removed via outlet 95 to a scrubber unit or cabinet (not shown). Scrubber units of appropriate character for such treatment are known in the art. For example, one scrubber unit that is potentially useful in the reaction system of the present disclosure is a dual scrubber cabinet system equipped with a CS Clean System 32 gal Novapure® Canister down-flow S447D (100%) scrubber, and 32 gal Novapure® Canister down-flow 5520 (100%) scrubber, connected in series with one another. These dual scrubbers include a fluoride scrubber and a hydride scrubber. The S447D unit employs LiOH on molecular sieves and the S520 unit utilizes hopcalite ($MnO_2$/CuO 3:1 mix). Such scrubber unit has a 90% point that is monitored with two Honeywell MDA sensors units equipped with HF and $B_2H_6$ sensors. $BF_3$ and $B_2F_4$ are the main constituents of the hazardous gaseous effluents from the reactor system pumps, but some amount of heavy boron fluorides ($B_3F_5$, $B_8F_{12}$ and other $B_xF_y$ species) and HF are expected as well. Gases are sent to the scrubber either during manifold purge routines or while discarding unwanted gases from system lines. The following table demonstrates the scrubbing capacity with respect to each gas:

CS Clean System 32 gal Novapure ® Canister Scrubbing Capacity

| | Resin | | | | | | |
|---|---|---|---|---|---|---|---|
| | S447D Volume fraction 100% | | S520 100% | | Scrubber | Max any time amount | Gas wt if 100% B2F4 decomposes |
| Gas | moles/L of resin | g/L of resin | moles/L of resin | g/L of resin | total capacity, g | of gas on system, g | into respective |
| B2F4 | no data | | no data | | no data | 400 | |
| BF3 | 1.43 | 97.24 | 0.00 | 0.00 | 12104 | 3334 | 370 |
| BxFy | no data | | no data | | no data | <50 | |
| HF | 4.00 | 76.00 | 0.00 | 0.00 | 9460 | <50 | 310 |
| B2H6 | 0.00 | 0.00 | 0.57 | 15.96 | 1987 | <50 | 114 |

A vacuum assembly is used during the operation of the reactor system which includes two dry pumps, a MDP (Molecular Drag pump) 48 and an ACP 122P vacuum pump 86, which can pump the entire process system to a vacuum level of ~$10^{-6}$ torr, as necessary for the reaction. The MDP has a low rotational speed of 27000 rpm and is sufficiently robust to operate under conditions involving accidental air in-rush, shock venting or gyroscopic effects, with a pumping performance between 10 mbar and $10^{-5}$ mbar, and a maximum flow rate of 400 sccm. The ADP pump runs at 100° C. temperature and includes a frictionless and oil-free pump mechanism that is capable of maintaining a pressure level of $10^{-2}$ torr.

Helium from tank 30 via line 35 may be used to clean or purge the process system.

While the system and method have been described with respect to various aspects, implementations and embodiments, it will be appreciated that any of such aspects, implementations and embodiments can be present in any combination with any other aspects, implementations and embodiments of the disclosure. The disclosure therefore is to be regarded as comprehending all permutations and combinations of compatible features individually or specifically described, in corresponding aggregations of such features. It further is to be recognized that any one or more of the individual features specifically disclosed herein may be selectively excluded from any other feature or combination of features disclosed herein, in specific implementations of the reactor system and method of the present disclosure, as further embodiments thereof.

While the disclosure has been has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. A reactor system comprising:
a reaction zone for contacting $BF_3$ gas with boron-containing solids under temperature and pressure conditions effective to form an intermediate species;
an opening for allowing an unreacted portion of $BF_3$ gas and the intermediate species to exit the reaction zone into a condensation zone for effecting reaction between the intermediate species and the unreacted portion of the $BF_3$ gas to form a reaction product comprising $B_2F_4$ wherein the condensation zone effects reaction between the intermediate species and the unreacted portion of the $BF_3$ gas to form a reaction product comprising $B_2F_4$ by cooling the intermediate species and the unreacted portion of the $BF_3$ gas in a cryogenic temperature range and wherein the cryogenic temperature range is controlled by use of a hydraulic lift configured to translate a vessel containing material that can cool at cryogenic temperatures, in a selected one of upward and downward directions, between an uppermost position and a lowermost position;
a recovery zone for recovering the reaction product and unreacted $BF_3$ gas; and
a recycling zone for recycling the recovered unreacted $BF_3$ gas to the reaction zone, wherein the recycling zone comprises a purification zone effective to reduce impurities in the unreacted $BF_3$ gas.

2. A reactor system comprising:
a reaction zone for contacting $BF_3$ gas with boron-containing solids under temperature and pressure conditions effective to form an intermediate species; the reaction zone comprises a double-walled quartz jacket;
an opening for allowing an unreacted portion of $BF_3$ gas and the intermediate species to exit the reaction zone into a condensation zone for effecting reaction between the intermediate species and the unreacted portion of the $BF_3$ gas to form a reaction product comprising $B_2F_4$; the condensation zone comprises a stainless steel vessel and a seal surrounding the opening, the seal sealingly connecting the reaction zone to the condensation zone, wherein the seal is effective to sealingly connect the reaction zone to the condensation zone under vacuum or super-atmospheric pressures;
a recovery zone for recovering the reaction product and unreacted $BF_3$ gas; and
a recycling zone for recycling the recovered unreacted $BF_3$ gas to the reaction zone, wherein the recycling zone comprises a purification zone effective to reduce impurities in the unreacted $BF_3$ gas.

3. The reactor system of claim 2, wherein the seal comprises an O-ring including a perfluoroelastomer material disposed beneath a split flange, the split flange effective to maintain a pressure on the seal.

4. An apparatus for production of $B_2F_4$, comprising:
a reactor containing a boron reactant that is reactive with boron trifluoride, $BF_3$, to yield boron fluoride, BF, wherein said reactor is configured to provide process conditions effective for reaction of $BF_3$ and said boron reactant to yield BF as a reaction product, and to discharge BF and unreacted $BF_3$ as a reactor effluent;

a source of $BF_3$ arranged to supply $BF_3$ to the reactor;

a condensation zone configured to receive the reactor effluent from the reactor and to provide process conditions effective for condensation of BF and $BF_3$ to yield $B_2F_4$; and a recirculation loop for flowing to the reactor unreacted $BF_3$ recoverable from the condensation, wherein the recirculation loop comprises a purification unit configured to purify recirculated $BF_3$ flowed to the reactor, wherein the purification unit comprises a freeze-pump-thaw purification unit.

5. The apparatus of claim 4, wherein the reactor contains elemental boron as said boron reactant.

6. The apparatus of claim 5, wherein the elemental boron is in a monocrystalline form comprising crystal planes of differing reactivity to boron trifluoride, and a major fraction of surface area of said elemental boron exposed to boron trifluoride as said boron reactant comprises surface area of a crystal plane having higher reactivity to boron trifluoride than other crystal plane(s) of said monocrystalline boron.

7. A method for production of $B_2F_4$, using the reactor of claim 4, said method comprising:

reacting boron reactant in a reaction zone of the reactor with said source of $BF_3$ arranged to supply boron trifluoride, $BF_3$, to the reactor to yield boron fluoride, BF; said reactor configured to provide process conditions effective for reaction of $BF_3$ and said boron reactant to yield BF as a reaction product, and to discharge BF and unreacted $BF_3$ as a reactor effluent;

condensing BF and unreacted $BF_3$ from said reacting, to yield $B_2F_4$ in said condensation zone configured to receive the reactor effluent from the reactor and to provide process conditions effective for condensation of BF and $BF_3$ to yield $B_2F_4$;

purifying unreacted $BF_3$ recovered from said condensing in the recirculation loop, said recirculation loop for flowing to the reactor unreacted $BF_3$ recoverable from the condensation comprises a freeze-pump-thaw purification unit configured to yield purified $BF_3$; and recirculating said purified $BF_3$ to the reaction zone of the reactor, wherein said purifying comprises freeze-pump-thaw purification.

8. The method of claim 7, wherein said boron is in a monocrystalline form comprising crystal planes of differing reactivity to boron trifluoride, and a major fraction of surface area of said monocrystalline boron exposed to boron trifluoride in said reacting comprises surface area of a crystal plane having higher reactivity to boron trifluoride than other crystal plane(s) of said monocrystalline boron-containing solid.

* * * * *